United States Patent [19]
Young

[11] 3,879,050
[45] Apr. 22, 1975

[54] TRAILER FOR TRANSPORTING BUILDINGS

[76] Inventor: Wilbur E. Young, Rt. 7, New Waterford, Ohio 44445

[22] Filed: Dec. 19, 1973

[21] Appl. No.: 426,200

[52] U.S. Cl. ............... 280/30; 52/143; 280/150.5
[51] Int. Cl. .............................................. B62b 1/04
[58] Field of Search .......... 280/30, 150.5, 34 A, 63, 280/106 T; 52/65, 127, 143; 212/145

[56] References Cited
UNITED STATES PATENTS

| | | | |
|---|---|---|---|
| 2,790,673 | 4/1957 | Zur Nieden | 280/34 A |
| 2,898,143 | 8/1959 | Ferrera | 52/143 |
| 3,330,574 | 7/1967 | Kulyk | 280/34 A |
| 3,521,902 | 7/1970 | Akers | 280/150.5 |
| 3,697,098 | 10/1972 | Fisher | 52/143 |
| 3,795,336 | 3/1974 | Acker | 52/143 |

*Primary Examiner*—Philip Goodman
*Assistant Examiner*—John A. Carroll
*Attorney, Agent, or Firm*—Webster B. Harpman

[57] ABSTRACT

An over the road trailer has horizontally and vertically adjustable members for engagement with a building or a portion of a building to be transported and incorporates devices for lifting the building or a portion of a building relative to the trailer and its ground engaging wheels and supporting the same during transit whereby a building, such as a single car garage or a portion of a multi-car garage, can be lifted, transported and lowered at a new location.

5 Claims, 3 Drawing Figures

PATENTED APR 22 1975  3,879,050

– 1 –
TRAILER FOR TRANSPORTING BUILDINGS

BACKGROUND OF THE INVENTION

1. Field of the Invention

This invention relates to trailers arranged to temporarily support and transport a building or a portion of a building over a highway.

2. Description of the Prior Art

Prior structures of this type may be seen in U.S. Pat. Nos. 3,356,381 and 3,108,820 wherein devices are disclosed which are attachable to a building so that the same can be elevated thereby and wheels attached thereto. Still further versions of the prior art may be seen in U.S. Pat. Nos. 1,241,720 and 3,247,630, both of which relates to shed structures having movable means incorporated therein.

The present invention relates to an improvement in that it discloses a trailer with sidewardly and vertically adjustable devices whereby a building or a portion of a building may be elevated relative to the trailer itself, secured in elevated relation and transported to a different location and then lowered as to a new foundation. The trailer of the invention may be hinged midway between its ends so that it can be folded upon itself to shorten the trailer for its return trip.

SUMMARY OF THE INVENTION

A trailer for transporting buildings consists of a horizontally disposed, elongated frame having ground engaging wheels therebeneath and a tow bar arrangement at one end and a plurality of horizontally disposed, sidewardly extensible members, the outer ends of which carry a vertical support and elevating devices of various lengths. The trailer when positioned within a building, such as a single garage or half of a double garage or the like, permits adjustment of the horizontally disposed members to match the width of the building and the attachment of the vertical support members to the building and the elevation thereof relative to the trailer by the lifting means whereupon the building may be transported to a different location.

DESCRIPTION OF THE PREFERRED EMBODIMENT

Figure 1:
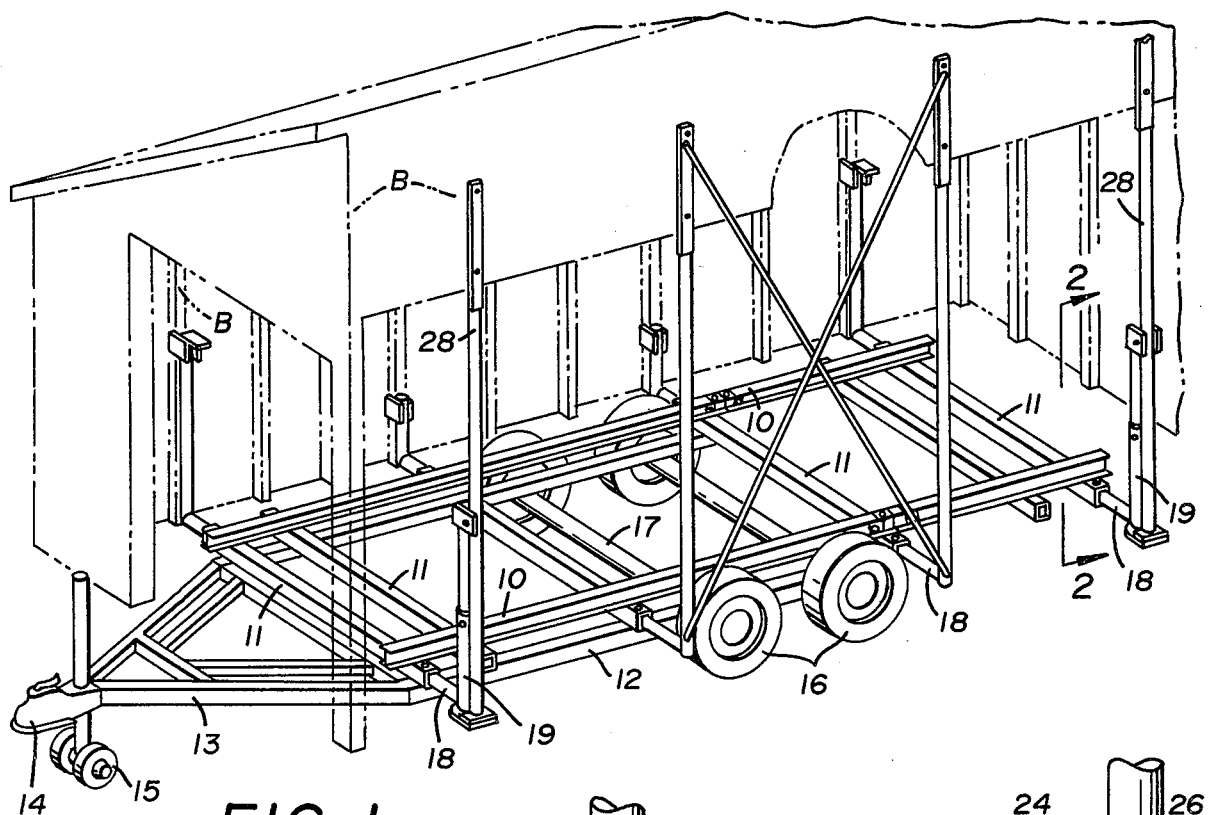
FIG. 1 is a perspective view of the trailer for transporting buildings with broken lines indicating a portion of a building positioned thereon.

By referring now to FIG. 1 of the drawings, the trailer for transporting buildings may be seen to comprise a pair of horizontally spaced, longitudinally extending main frame members 10 which are secured in spaced parallel relation by a plurality of transversely positioned tubular frame members 11. A sub-frame 12 is positioned below and attached to the tubular frame members 11 and has a V-shaped extension 13 at its forward (left) end which terminates in a trailer hitch 14 and a dolly wheel assembly 15. Ground engaging wheels 16 are affixed to axles 17 which are in turn appropriately mounted on the sub-frame 12 so that the entire trailer may be moved over a highway by attaching the same to a suitable towing vehicle not shown.

Still referring to FIG. 1 of the drawings, it will be observed that several of the tubular frame members 11 have oppositely disposed pairs of telescopically engaged, sidewardly movable arms 18 disposed therein and that each of the sidewardly movable arms 18 has a vertically positioned, right angularly disposed sleeve 19 on its outermost end. Each of the sleeves 19 slidably receives a vertical post 20 and each of the vertical posts 20 is provided with a plurality of vertically spaced openings in which pins 21 can be positioned so as to hold the vertical posts 20 in fixed relation to the sleeves 19.

Figure 2:
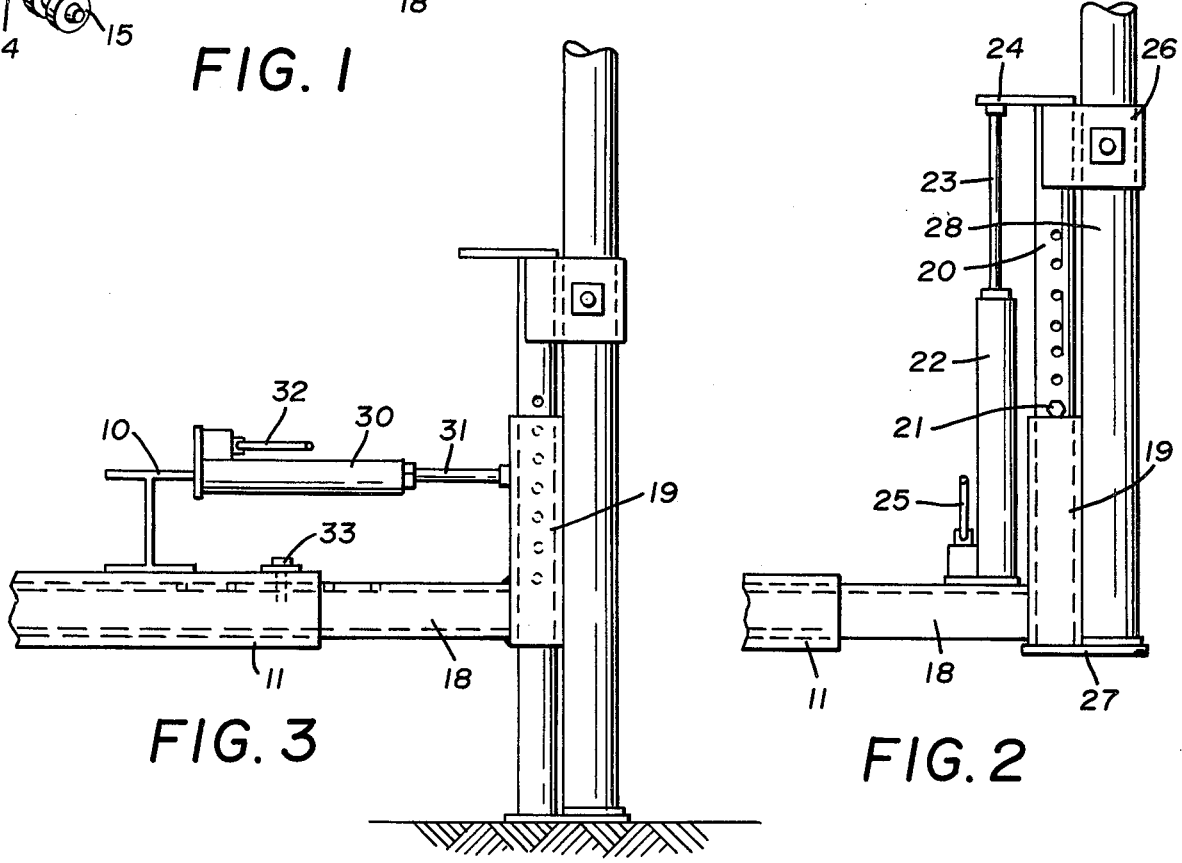
FIG. 2 is an enlarged cross sectional detail on line 2—2 of FIG. 1.

In FIG. 2 of the drawings a lifting device such as a jack 22 is illustrated as being positioned on the sidewardly movable arm 18 adjacent the sleeve 19 with the vertically extensible member 23 of the jack 22 engaged on an offset portion 24 of the vertical post 20 so that the same can be moved vertically relative to the sidewardly movable arm 18 when the jack 22 is actuated as by an operating lever 25. An oppositely disposed offset bracket 26 is attached to each of the vertical posts 20 adjacent its upper end and a similarly offset base bracket 27 is attached to each of the posts 20 adjacent its lower end. As illustrated in FIG. 1 and FIG. 2 of the drawings a vertically disposed support member 28 is positioned on the base 27 and secured to the offset bracket 26 so that it can be moved vertically by the mechanism just described.

By referring to FIG. 1 of the drawings in particular it will be seen that the upper ends of each of the vertically disposed support members 28 are arranged to be engaged on a building to be supported thereby as shown in broken lines and indicated by the letter B. The broken line representation of the building seen in FIG. 1 represents one half of a double garage, the central portion of which is in the foreground and is defined only by an elongated relatively high beam or truss forming the ridge of the building.

Figure 3:
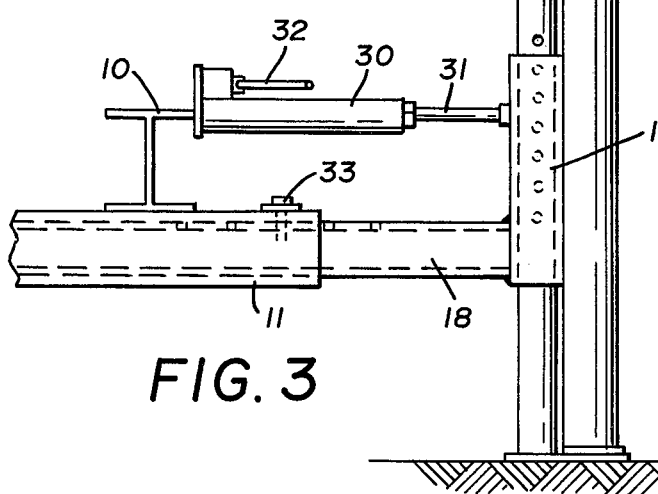
FIG. 3 is an enlarged detailed elevation of a portion of the trailer seen in FIG. 1 and including a device for moving the parts horizontally with respect to one another.

By referring now to FIG. 3 of the drawings, it will be seen that the construction comprising one of the tubular frame members 11 and is telescopically positioned, sidewardly movable arm 18 as heretofore described in connection with FIG. 2 of the drawings has been provided with a secondary jack 30, the extensible member 31 of which is shown engaged on the sleeve 19 and the base of which is shown engaged on one of the longitudinal frame members 10 of the trailer.

It will occur to those skilled in the art that when the jack 30 is operated to move the extensible member 31 as by an operating lever 32, the sidewardly movable arm 18 will move outwardly carrying with it the vertically disposed support member 28 and the lifting device 22 all as hereinbefore described in connection with FIG. 2 of the drawings. In such extended, adjusted position the support members 28 may be attached to the inner walls or upper portions of a garage or similar building while the same is on its regular foundation or a point of construction and the trailer positioned within the same as illustrated in FIG. 1 of the drawings. When the sidewardly movable arms 18 have been properly adjusted to match the width of the building to be lifted and transported, pins 33 may be positioned in registering openings in the frame members 11 and arms 18 to hold the same in adjusted relation whereupon the several jacks 22 may be actuated to lift the building so that it is supported completely on the trailer with the lower edges of the walls of the building elevated with respect to a road surface over which the trailer may then be moved as in transporting the building. Upon reaching a desired location the jacks 22 may be operated to lower the buildings, the support members 28 may be detached therefrom and the sidewardly movable arms 18 returned to positions substantially within the transverse tubular frame members 11 of the trailer whereupon the trailer may be withdrawn through the open end of the building as seen for example in FIG. 1 of the drawings.

As hereinbefore noted the main frame of the trailer may be hinged midway between its ends so that for transport back to its point of origin it may be folded to decrease the length thereof and it will thus be seen that a trailer for transporting buildings over the highway has been disclosed which enables a manufacturer of garages and small buildings of a similar size and shape to be readily transported from a point of manufacture to a point of ultimate disposition.

Those skilled in the art will observe that while several of the sidewardly extensible and vertically adjustable lifting devices have been described and illustrated in the embodiment of the invention herein chosen for illustration, additional such devices may be used to support the building intermediate the actual lifting devices as seen for example in FIG. 1 of the drawings.

It will be observed that winches and cables may be used in place of the jacks 22 and 30 hereinbefore described and the support members on the arms 18 not so actuated can be rotatably positioned manually when the building has been elevated so as to help support the same during transit.

It will thus be seen that a trailer for transporting buildings has been disclosed which may be positioned in a building to be transported, adjusted to the size and height thereof and portions of the device elevated together with the building so as to carry the building thereon whereupon the same may be transported and subsequently lowered in a new location.

Although but one embodiment of the present invention has been illustrated and described it will be apparent to those skilled in the art that various changes and modifications may be made therein without departing from the spirit of the invention.

I claim:

1. Apparatus for lifting, transporting and lowering a building having an opening therein through which said apparatus can be moved consisting of a horizontally disposed frame having a plurality of transverse frame members, oppositely disposed sidewardly movable arms carried by said transverse frame members, vertically positioned members on the outer ends of said arms and vertically movable support members on said vertically positioned members for temporary supporting attachment to said building, means for moving said support members so as to lift and lower said building relative to said frame, ground engaging wheels on said frame and a trailer hitch on one end of said frame.

2. The apparatus set forth in claim 1 and wherein said sidewardly movable arms are telescopically engaged in some of said plurality of transverse frame members.

3. The apparatus set forth in claim 1 and wherein said sidewardly movable arms are telescopically engaged in some of said transverse frame members and fasteners detachably engage said frame members and said sidewardly movable arms.

4. The apparatus set forth in claim 1 and wherein said frame is formed in two portions disposed in end to end relation and hinges secured to said portions act to join said portions to permit the frame to be folded upon itself whereby the overall length of the frame may be reduced.

5. The apparatus set forth in claim 1 and wherein said vertically positioned members are sleeves and said vertically movable support members are movably positioned in said sleeves and means is provided for temporarily securing said support members to said sleeves.

* * * * *